Figure 1:
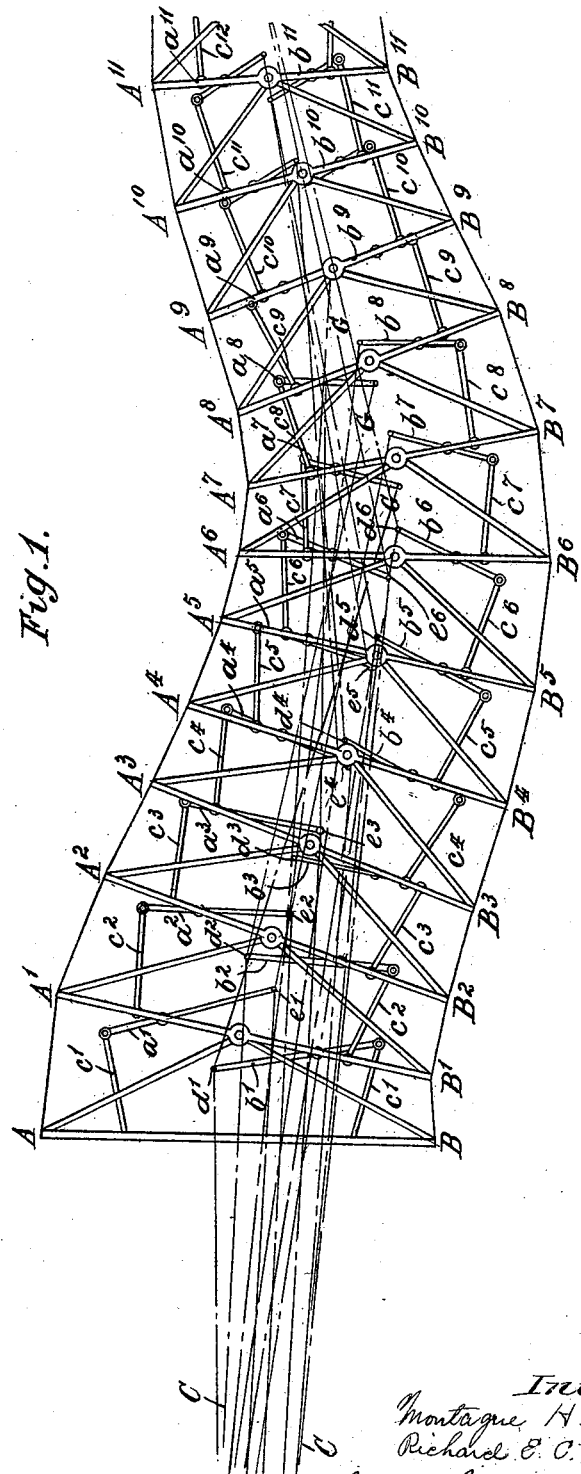

No. 621,719. Patented Mar. 21, 1899.
M. H. C. & R. E. C. SHANN.
MEANS FOR PROPELLING VESSELS.
(Application filed July 22, 1897.)
(No Model.) 4 Sheets—Sheet 1.

No. 621,719. Patented Mar. 21, 1899.
M. H. C. & R. E. C. SHANN.
MEANS FOR PROPELLING VESSELS.
(Application filed July 22, 1897.)
(No Model.) 4 Sheets—Sheet 2.

Witnesses:
J. M. Fowler Jr.
Thomas Durant

Inventors:
Montague H. C. Shann 2nd
Richard E. C. Shann
by Church & Church
their Attorneys.

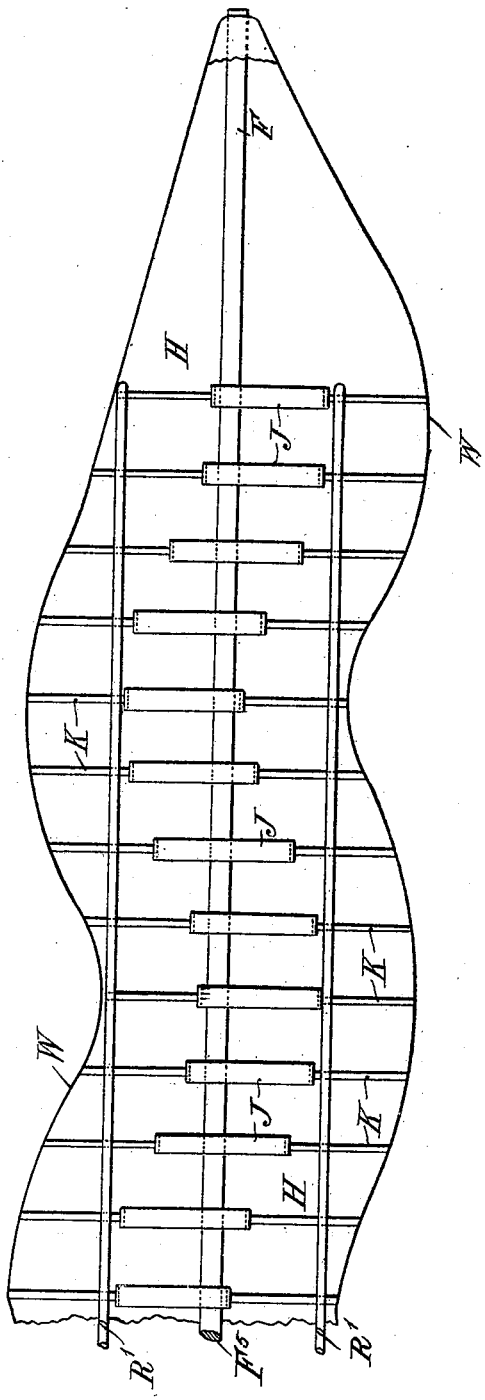

No. 621,719. Patented Mar. 21, 1899.
M. H. C. & R. E. C. SHANN.
MEANS FOR PROPELLING VESSELS.
(Application filed July 22, 1897.)
(No Model.) 4 Sheets—Sheet 4.
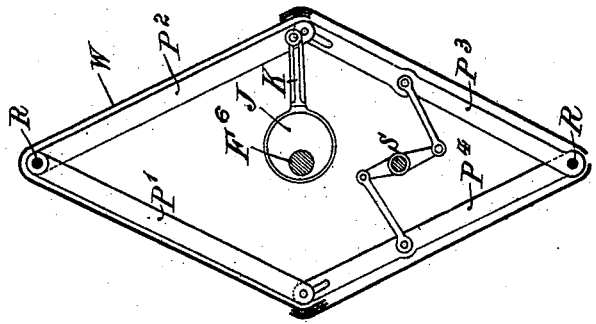
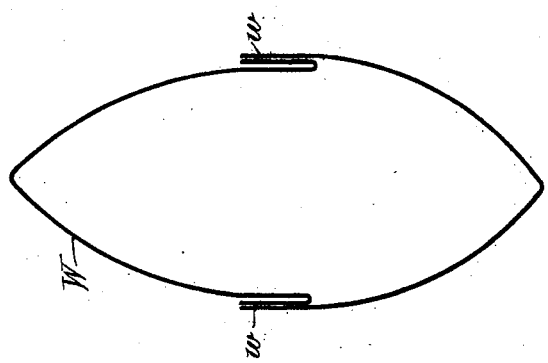
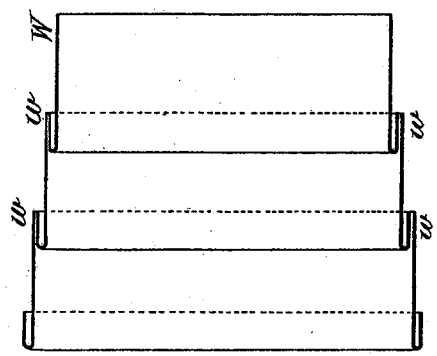
Witnesses:
J. M. Fowler Jr
Thomas Durant
Inventors:
Montague H. C. Shann &
Richard E. C. Shann
by Church & Church
their Attorneys.

UNITED STATES PATENT OFFICE.

MONTAGUE HERBERT CHURCHILL SHANN AND RICHARD ERNEST CHURCHILL SHANN, OF SHOREHAM, ENGLAND.

MEANS FOR PROPELLING VESSELS.

SPECIFICATION forming part of Letters Patent No. 621,719, dated March 21, 1899.

Application filed July 22, 1897. Serial No. 645,615. (No model.)

*To all whom it may concern:*

Be it known that we, MONTAGUE HERBERT CHURCHILL SHANN and RICHARD ERNEST CHURCHILL SHANN, subjects of the Queen of England, residing at Shoreham, England, have invented certain new and useful Improvements in or Relating to the Propulsion of Vessels, of which the following is a specification.

This invention relates to the propulsion and incidentally to the construction and form of vessels.

In this invention we contemplate forming so much of the vessel as may be necessary of a flexible construction and providing mechanism by which the outline of the flexible portion may be varied so as to obtain more or less the propelling movement of a fish or a fish's tail. It is difficult to accurately describe this movement, but for lack of a better definition we may term it a "sinuous" movement, producing a series of waves or wave movements directed astern or ahead, according as the vessel is to be driven ahead or astern. Steering can be effected by altering the axis about which the sinuosity is produced and reversal of the direction in which the vessel travels by reversing the order or sequence of the movements—as, for example, by reversing the direction of rotation of the engine-shaft. It is not essential that the two sides of the flexible portion or "tail" shall move synchronously, in the same sense maintaining a constant cross-section at each point in the length of the tail. They might, for instance, move synchronously in opposite directions, thus producing the effect of a series of swellings and contractions continually traveling down the tail. We do not bind ourselves to any particular construction; but one plan would be for the tail to be formed of articulated rings covered or lined with india-rubber or other suitable material, or a spiral may be adopted, as in the well-known flexible metallic tubing. The necessary sinuous movement may be imparted by mechanism one form of which would consist of one or more shafts, barrels, or equivalent provided with eccentrics, cams, cranks, or their equivalent and operating through the medium of connections, preferably subjected only to tensile stress, so as to produce the required movements. Each string or sinew may be connected to one ring or convolution and may be carried around or pivoted to another one, so that the one string or equivalent would effect the movement of two rings or convolutions, or even more might be connected to one string. The convolution may be pivoted to a central support, or the string may operate in conjunction with such supports, so as to obtain the necessary movement, and two or more strings may be connected to a single ring upon one or both sides. We may, however, employ rigid rods, tubes, or equivalent instead of the previously-mentioned strings or cords, wires, or the like, or electrical devices may be used; or, again, flexible or rigid shafts or tubes may be employed to operate through worm-gearing. In a modified form we employ vanes of flexible material or inflexible material flexibly connected, operating those by arms or spines projecting from the vessel, so as to impart the necessary sinuosity of movement. Any suitable source of power may be employed and applied in any desired manner. The cross-section of the flexible portion of the vessel may be elliptical or other form best adapted to carry out the object in view, and the shape of the whole vessel may be modified for this purpose.

Figure 2:
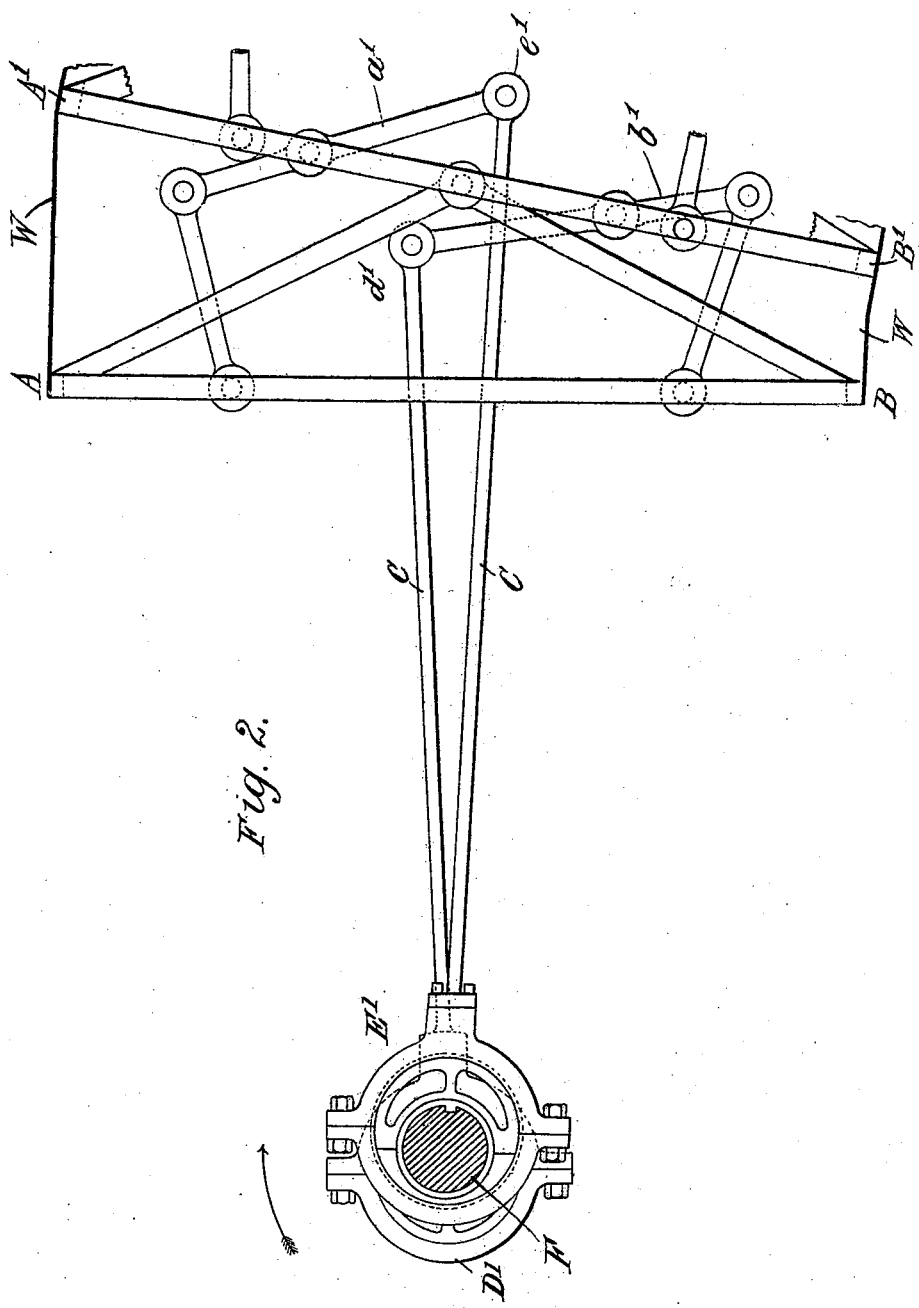

In the accompanying drawings, Figure 1 is a diagram showing one arrangement of the framework and actuating-gear of the flexible tail. It may be considered as either a horizontal or a vertical view, it being immaterial as regards propulsion which of these or intermediate positions is adopted so long as a supply of solid water is obtained. Fig. 2 is an enlarged view of the left-hand portion of Fig. 1, giving more constructional details. Fig. 3 shows in diagram another method of actuating the tail. Fig. 4 is a sectional elevation showing one construction of waterproof covering for a flexible tail of the kind hereinbefore described. Fig. 5 is a transverse section indicating an alternative construction of waterproof covering for the flexible tail. Fig. 6 is a transverse section of a flexible tail with means for operating the same alternative to those described with reference to the other figures.

In Figs. 1 and 2, A B, A' B', A² B², &c., are a diminishing series of articulated frames, triangular in the view shown, and otherwise suited to the desired cross-section of the tail at each position. The frame A B is rigidly connected to the vessel, and the movements of the frames A' B' to $A^6$ $B^6$ are controlled through a system of levers, links, and eccentric-rods, as shown. In each frame are pivoted levers $a'$ and $b'$, $a^2$ and $b^2$, &c., connected at one end by pairs of links $c'$ $c'$, $c^2$ $c^2$, &c., to the preceding frame. The other ends $e'$ $e^2$, &c., and $d'$ $d^2$, &c., of the levers $a'$ and $b'$, &c., are respectively attached by rods C to eccentrics E' and D', &c., carried by the driving-shaft F. A second series of frames $A^7$ $B^7$ to $A^{12}$ $B^{12}$ are shown behind the series A' B' to $A^6$ $B^6$, being similarly controlled by coupling-rods G from the ends of the eccentric-rods C. It will be obvious that an indefinite number of series of frames might be added and that the number in each series is not restricted to six, but may be more or less, according to the number of eccentrics or driving-points of the driving-shaft F.

Considering the frame A' B', as the driving-shaft F commences to revolve in the direction shown by the arrow it will be seen that the end $e'$ of the lever $a'$ will be drawn in, while the end $d'$ of the lever $b'$ is pushed out, causing frame A' B' to rock on its connecting-joint with the apex of frame A B, so that the points A and A' approach nearer together and the points B and B' become farther separated. Similarly with the other frames up to $A^6$ $B^6$, the result being that each frame is swung upward (on the drawings) around the preceding frame. The second series of frames $A^7$ $B^7$ to $A^{12}$ to $B^{12}$, being cross-connected by coupling-rods G, ($a^7$ to $b'$ and $b^7$ to $a'$, &c.,) are at the same time swung in the reverse direction, with the result that while in the course of half a revolution of the shaft F the frame $A^6$ $B^6$ has traveled across from a position of maximum displacement on one side of the axis to a similar position on the other side, the wave of the tail then being the reverse of that shown.

Fig. 3 shows another construction, in which $F^5$ is the driving-shaft, E the flexible tail, and J a series of eccentrics on shaft $F^5$ helically disposed around it and giving a wave motion to the tail by means of the eccentric-rods or equivalent K, guided by stationary supporting-rods R'. W is a flexible covering. This arrangement has not so much flexibility as that previously described, which we prefer.

The eccentrics may be arranged in groups, and these or the individual eccentrics may be adjustable, and the grouping may be variable to produce special effects for reversing steering or for other purposes.

A rudder may, if desired, be carried upon the end of a flexible and sinuously-moved portion or tail, according to this invention, and operated independently thereof.

The tail may be covered with any suitable flexible waterproof material, as shown at W—for example, india-rubber or proofed fabric. This may be formed in rings, (tapered or parallel,) and these may be stitched, riveted, cemented, or otherwise joined or socketed together and, if required, rolled or folded over, as shown at $w$ in Fig. 6 of the accompanying drawings. Inflexible material flexibly connected may be employed to form a flexible casing or lining for the purposes of this invention. In the construction shown in Fig. 5 the line of the fold $w$ of the casing is parallel with the length of the tail. The folded construction indicated in this and the preceding figure is very advantageous, inasmuch as it permits the movement of the joined sections of the covering relatively to each other with but litttle frictional resistance in the movement of the tail, or the waterproof material may be inside as a lining and may be retained against the walls by compressed air, or the interior of the tail or vessel may be charged with compressed oil, or it may be jacketed internally and the space between the walls filled with compressed air or oil. The compressed air or oil may be used without the lining.

In the modification illustrated in Fig. 6 the driving-shaft $F^6$ runs lengthwise of the tail, as in Fig. 3, and has upon it a series of eccentrics J, each one operatively connected to an articulated frame of bars P' $P^2$ $P^3$ $P^4$. Frames of this kind are arranged to surround the shaft F at intervals in its length within the casing W, each one being connected, as by the rod K, to a corresponding eccentric J, so that the latter in its rotation with the shaft expands and contracts the frame, the expansion and contraction of the several frames in the desired order producing a wavy motion in the surfaces of the tail by the changes of its cross-sectional form at the different frames. The bars P' $P^2$ at their junction with each other and also the bars $P^3$ $P^4$ may be journaled on or supported by rods R, (seen in section in the drawings,) held stationary in positions parallel to the shaft $F^6$. At the opposite angles of each frame the connection of these bars with each other or with the rods R may be by pin-and-slot or equivalent connections, if desired, and the bars may be coupled to each other, as by the linkage S, to insure the synchronous movement of opposite sides of the frame.

Springs or spring connections may be introduced into the apparatus wherever required and are desirable where they can be used for the purpose of minimizing shocks or counteracting inertia or the too great rigidity of the structure.

We do not confine ourselves to the details described or shown in the drawings, but may employ numerous modifications or variations in form and arrangement and in the nature of the gearing employed for transmitting power to the flexible portion.

We claim—

1. In the herein-described improvement in the propulsion of vessels, the combination with the hollow flexible projection secured at one end to the vessel, of mechanical means located within said projection for imparting to it a successive undulatory movement from end to end thereof transversely of its length; substantially as set forth.

2. In the herein-described improvement in the propulsion of vessels, the combination with the hollow flexible projection secured at one end to the vessel, of mechanical means located within the projection for imparting to the two sides thereof synchronous undulatory movements from end to end thereof transversely of its length; substantially as set forth.

3. In the herein-described improvement in the propulsion of vessels, the combination with the hollow flexible tail-like projection secured at one end to the vessel, mechanical means within said projection for imparting successive undulatory movement from end to end thereof transversely of its length, and means for altering the axis about which the undulatory movement is produced, whereby the vessel may be steered; substantially as described.

4. In the herein-described improvement in the propulsion of vessels, the combination with the hollow flexible projection secured at one end to the vessel, of means for imparting a successive undulatory movement from end to end thereof transversely of a central longitudinal axis; as set forth.

5. In the herein-described improvement in the propulsion of vessels the combination with tail-like projection formed of a series of articulated frames covered with an elastic or flexible skin and means for imparting to said frames a rocking motion about their pivotal points of connection; substantially as and for the purpose set forth.

6. In the herein-described improvement in the propulsion of vessels, the combination with the series of triangular frames each succeeding frame being pivoted to the apex of the frame preceding, of the levers pivoted in the frame the link connection between said levers and preceding frame, and connection between the links and driving mechanism; substantially as and for the purpose set forth.

7. In the herein-described improvement in the propulsion of vessels, the combination with the series of triangular frames, a second series of triangular frames, the frame of each series being pivotally connected substantially as described, the lever pivoted to the frames of the first series, the links connected at one end to the levers and at the other to the frames, the connection between the driving-shaft and levers, the lever-and-link connection of the second series of frames, and cross connection between the levers carried by the first series of frames and those of the second series, substantially as set forth.

In testimony whereof we have hereto set our hands in the presence of the two subscribing witnesses.

MONTAGUE HERBERT CHURCHILL SHANN.
RICHARD ERNEST CHURCHILL SHANN.

Witnesses:
ALFRED J. BOULT,
HARRY B. BRIDGE.